US008676593B2

(12) United States Patent
Nagpal et al.

(10) Patent No.: US 8,676,593 B2
(45) Date of Patent: Mar. 18, 2014

(54) GEOGRAPHIC GOVERNANCE OF DATA OVER CLOUDS

(75) Inventors: Abhinay R. Nagpal, Hadapsar (IN);
Sandeep R. Patil, Elmsford, NY (US);
Sri Ramanathan, Lutz, FL (US);
Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 12/888,548

(22) Filed: Sep. 23, 2010

(65) Prior Publication Data

US 2012/0078643 A1    Mar. 29, 2012

(51) Int. Cl.
*G06Q 10/00* (2012.01)

(52) U.S. Cl.
USPC ............. 705/1.1; 707/644; 707/654; 709/217

(58) Field of Classification Search
USPC .................................. 709/217; 707/654, 644
See application file for complete search history.

(56) References Cited

U.S. PATENT DOCUMENTS

| | | | |
|---|---|---|---|
| 7,403,939 B1 | 7/2008 | Virdy | |
| 7,636,885 B2 | 12/2009 | Merz et al. | |
| 7,711,767 B2 | 5/2010 | Agrawal et al. | |
| 8,074,014 B2* | 12/2011 | Narayanan et al. | 711/112 |
| 8,185,501 B1* | 5/2012 | Cherukumudi et al. | 707/647 |
| 2002/0023010 A1 | 2/2002 | Rittmaster et al. | |
| 2002/0023123 A1* | 2/2002 | Madison | 709/203 |
| 2003/0041167 A1 | 2/2003 | French et al. | |
| 2006/0026067 A1* | 2/2006 | Nicholas et al. | 705/14 |
| 2007/0168405 A1 | 7/2007 | Pomerantz | |
| 2010/0332454 A1* | 12/2010 | Prahlad et al. | 707/654 |
| 2011/0083167 A1* | 4/2011 | Carpenter et al. | 726/4 |
| 2013/0144838 A1* | 6/2013 | Bhasin | 707/637 |

FOREIGN PATENT DOCUMENTS

| | | |
|---|---|---|
| DE | 102004037568 A1 | 3/2006 |
| NL | 1025704 C2 | 9/2005 |
| WO | WO 01/08021 A1 | 2/2001 |

OTHER PUBLICATIONS

B. Braiker, "Living in the Clouds", http://www.newsweek.com/2008/06/09/living-in-the-clouds.print.html, Newsweek, Jun. 10, 2008, pp. 1-2.
K. J. Mathews, "Privacy Issues When 'Computing in the Cloud'", Proskauer: Privacy Law Blog, Nov. 26, 2008, pp. 1-3.
P. Mell, "The Nist Definition of Cloud Computing", National Institute of Standards of Technology, Information Technology Laboratory, Ver 15, Oct. 7, 2009, pp. 1-2.

(Continued)

*Primary Examiner* — Hassan Kizou
*Assistant Examiner* — Hashim Bhatti
(74) *Attorney, Agent, or Firm* — Matthew Chung; Roberts Mlotkowski Safran & Cole, P.C.

(57) ABSTRACT

Methods and systems for controlling a geographic region of data in cloud computing are described. A method implemented in a computer infrastructure including a combination of hardware and software includes: receiving a request from a local computing device to save data on a network including a plurality of data storage locations in a plurality of different geographic regions; determining a specified geographic region of the plurality of different geographic regions by analyzing at least one of: (i) file attributes associated with the data, and (ii) predefined rules; identifying one of the plurality of data storage locations within the specified geographic region based on the determining step; and routing the data to the identified one of the plurality of data storage locations within the specified geographic region.

23 Claims, 7 Drawing Sheets

(56) References Cited

OTHER PUBLICATIONS

F. P. Murphy, "Fedora 11 New Extended File Attributes Namespace", http://blog.fpmurphy.com/2009/06/fedora-11-extended-attibutes-namespace.html, Jun. 15, 2009, pp. 1-5.

B. Thompson, "Storm warning for cloud computing", http://news.bbc.co.uk/2/hi/7421099.stm, BBC News, May 27, 2008, pp. 1-3.

"Does Cloud Computing Mean More Risks to Privacy?", http://bits.blogs.nytimes.com/2009/02/23/does-cloud-computing-mean-more-risks-to-privacy, Feb. 23, 2009, pp. 1-2.

"Extended file attributes", http://en.wikipedia.org/wiki/Extended_file_attributes, Wikipedia, Jul. 19, 2010, pp. 1-3.

* cited by examiner

ERROR – The specified geographic region is currently unavailable.

Please select an alternative geographic region or save locally:

■ N. America  □ S. America  □ Europe  □ Africa
□ Australia  □ Asia  □ Antarctica

GEOGRAPHIC GOVERNANCE OF DATA OVER CLOUDS

TECHNICAL FIELD

The present invention generally relates to cloud computing, and more particularly, to methods and systems for controlling a geographic region of data in cloud computing.

BACKGROUND

Information technology is changing rapidly and now forms an invisible layer that increasingly touches nearly every aspect of business and social life. An emerging computer model known as cloud computing addresses the explosive growth of Internet-connected devices, and complements the increasing presence of technology in today's world. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

Cloud computing is massively scalable, provides a superior user experience, and is characterized by new, Internet-driven economics. In one perspective, cloud computing involves storage and execution of business data inside a cloud which is a mesh of inter-connected data centers, computing units and storage systems spread across geographies.

Because of the diverse and distributed nature of cloud computing, the data, applications, and infrastructure used in cloud computing may be located worldwide. It is often the case that a user does not know where their data is physically stored in a cloud computing environment, and this model works well for users that are not concerned with the geographic region of their stored data.

SUMMARY

In a first aspect of the invention, there is a method implemented in a computer infrastructure comprising a combination of hardware and software. The method includes: receiving a request from a local computing device to save data on a network comprising a plurality of data storage locations in a plurality of different geographic regions; determining a specified geographic region of the plurality of different geographic regions by analyzing at least one of: (i) file attributes associated with the data, and (ii) predefined rules; identifying one of the plurality of data storage locations within the specified geographic region based on the determining step; and routing the data to the identified one of the plurality of data storage locations within the specified geographic region.

In another aspect of the invention, there is a computer system for saving data on a network, the system comprising a CPU, a computer readable memory and a computer readable storage media. The system also includes first program instructions to present a plurality of geographic regions to a local computing device, wherein the plurality of geographic regions are associated with a plurality of data storage locations in a network, and the local computing device is accessing the network. The system further includes second program instructions to receive a specification of at least one of the plurality of geographic regions from the local computing device. The system additionally includes third program instructions to cause data associated with the local computing device to be physically stored at a device located within the specified at least one of the plurality of geographic regions. The first, second and third program instructions are stored on the computer readable storage media for execution by the CPU via the computer readable memory.

In an additional aspect of the invention, there is a computer program product comprising a computer usable storage medium having readable program code embodied in the storage medium. The computer program product includes at least one component operable to: receive a request to save data on a network, wherein the network comprises a plurality of data storage locations in a plurality of different geographic regions; determine a specified geographic region by analyzing at least one of: (i) file attributes associated with the data, and (ii) predefined rules; identify one of the plurality of data storage locations within the specified geographic region; and cause the data to be saved at the identified one of the plurality of data storage locations within the specified geographic region by routing the data to the identified one of the plurality of data storage locations within the specified geographic region.

In another aspect of the invention, there is a system comprising an intelligent routing system interfaced between a local computing device and a network. The network comprises a plurality of data storage locations in a plurality of different geographic regions. The intelligent routing system is configured to: receive a request from the local computing device to save data on the network; determine a specified geographic region by analyzing at least one of: (i) file attributes associated with the data, and (ii) predefined rules; identify one of the plurality of data storage locations within the specified geographic region; and cause the data to be saved at the identified one of the plurality of data storage locations within the specified geographic region by routing the data to the identified one of the plurality of data storage locations within the specified geographic region.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIG. 5B depicts an exemplary user interface and associated functionality in accordance with aspects of the invention.

DETAILED DESCRIPTION

Figure 1:
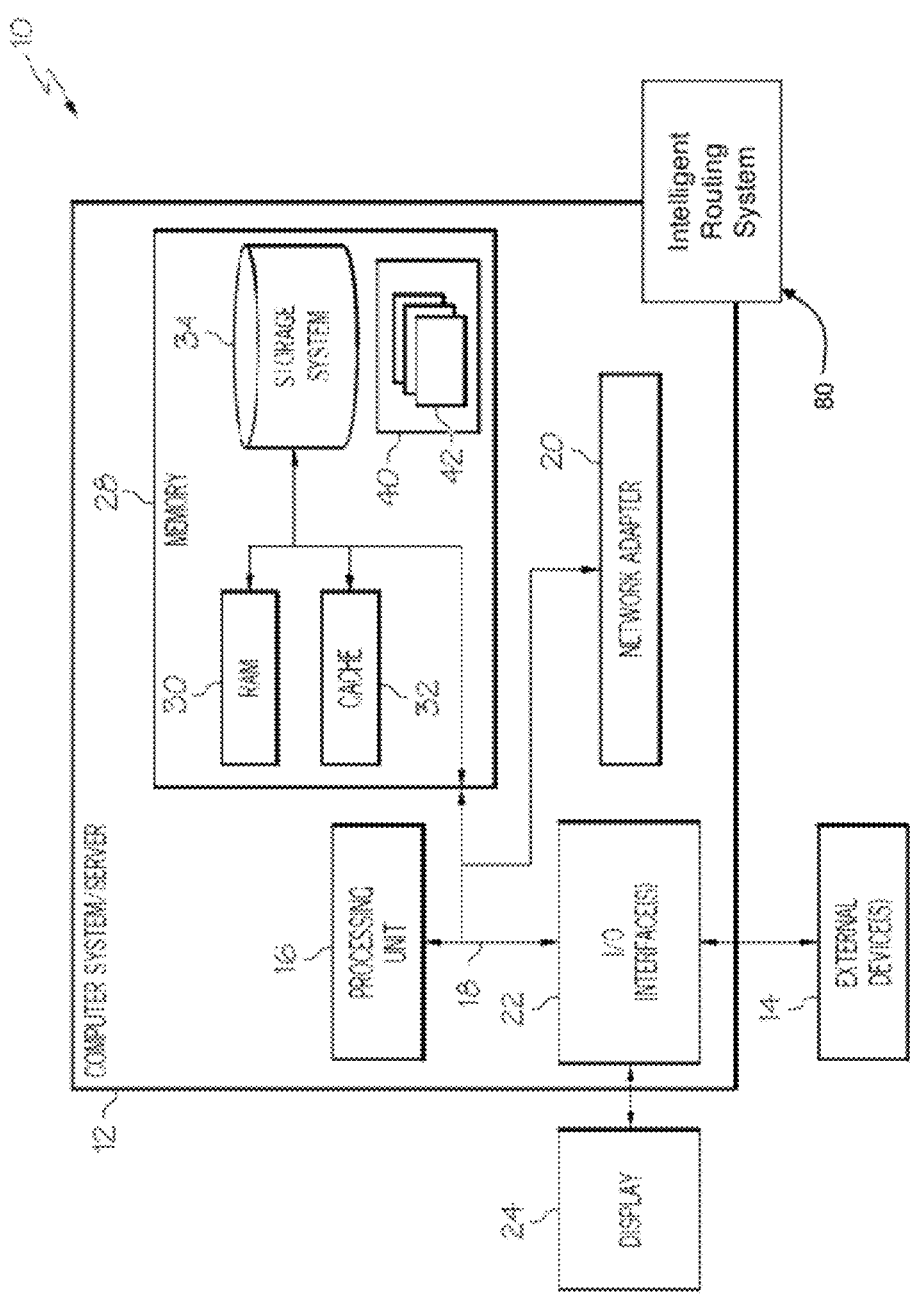
FIG. 1 depicts a cloud computing node according to an embodiment of the present invention.

The present invention generally relates to cloud computing, and more particularly, to methods and systems for controlling a geographic region of data in cloud computing. In accordance with aspects of the invention, a user may specify one or more geographic regions in which to save their data in a cloud computing environment. In embodiments, the user specifies geographic regions using at least one of: (i) user-selected file attributes, and (ii) predefined rules. The rule may be based on file content, semantic data, user identity, group association, local computing device location, etc. An intelligent routing system determines the user-specified geographic region(s), identifies a data storage center within the specified geographic region(s), and routes the data to the identified data storage center for physical storage of the data. In this manner, implementations of the invention advantageously provide a user with the ability and flexibility to control where their data is physically stored in a cloud computing environment.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (Paas): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. FIG. 1 can also represent a computing infrastructure capable of performing and/or implementing tasks and/or functions of the methods described herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16. In embodiments, the computer system/server 12 comprises or communicates with an intelligent routing system 80 as described in greater detail herein.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID (redundant array of inexpensive disks or redundant array of independent disks) systems, tape drives, and data archival storage systems, etc.

Figure 2:
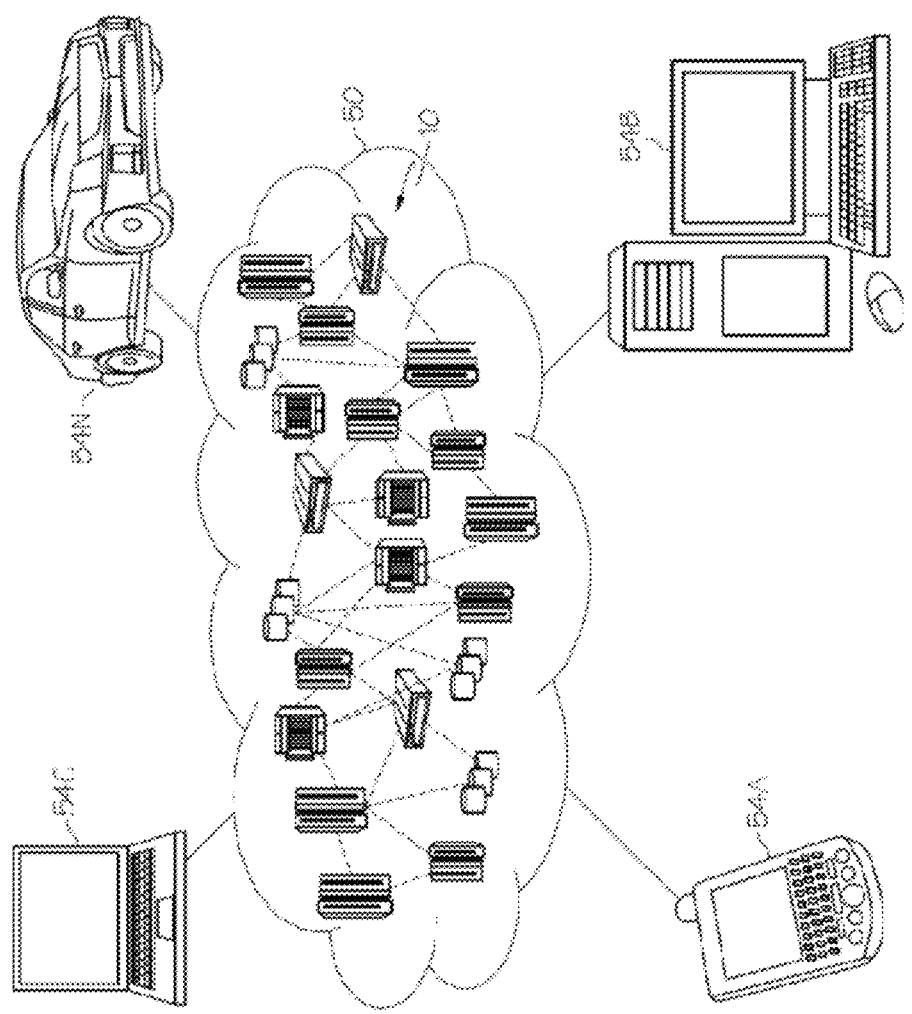
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
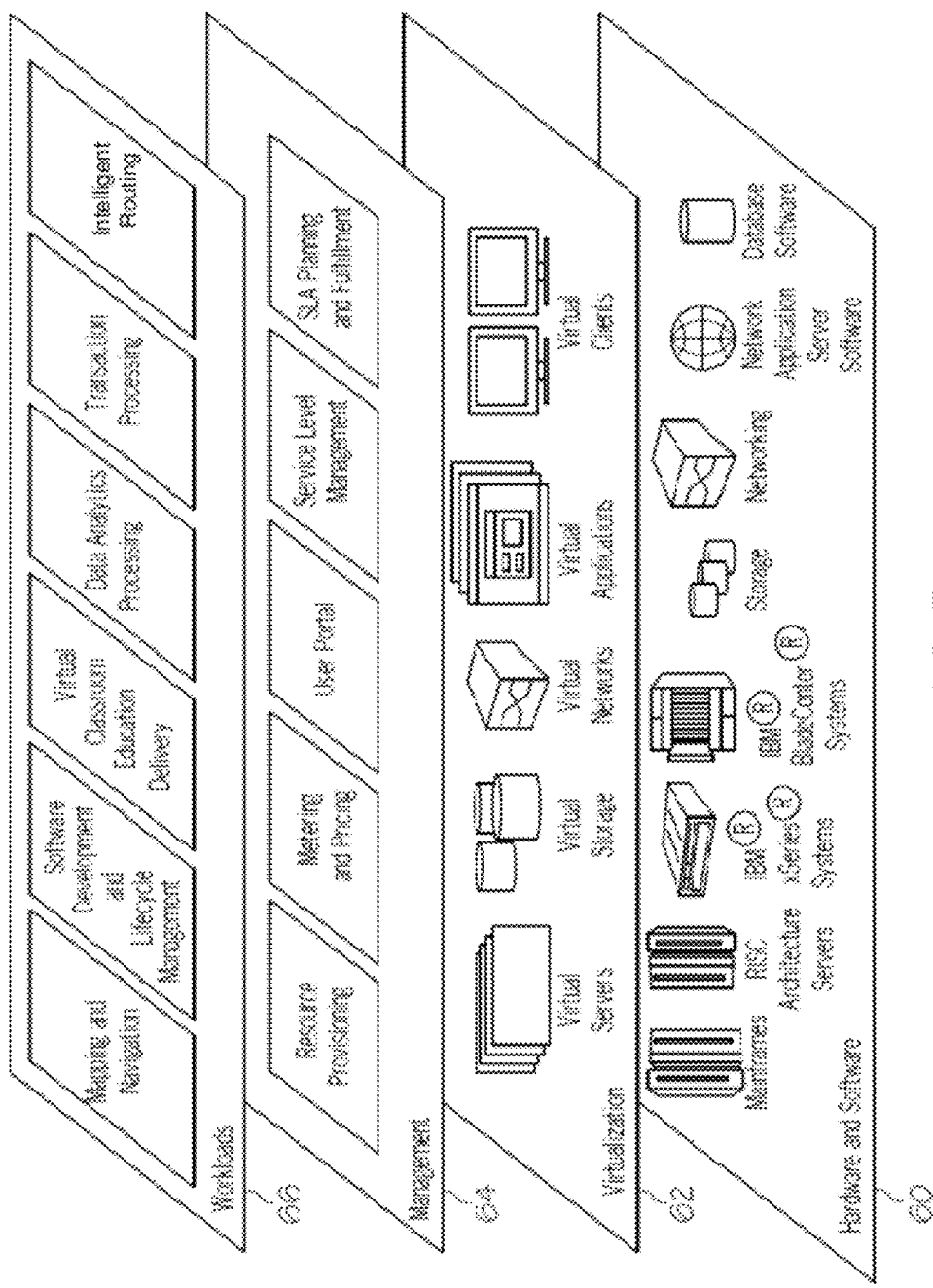
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries®systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and intelligent routing that controls the location of physical storage of cloud consumer data in the cloud computing environment 50. The cloud computing environment 50 may comprise numerous locations where data may be physically stored. For example, a plurality data storage devices used in the cloud computing environment 50 may be located in different geographic regions around the world. In accordance with aspects of the invention, a cloud consumer, such as an owner and/or user of a local computing device such as 54A, 54B, 54C, . . . , 54N, may specify one or more geographic regions (e.g., continents, countries, states, etc.) where their data is to be physically stored. Based upon the user specification, the "intelligent routing" functionality of embodiments of the invention causes the cloud consumer data to be routed to and saved at an appropriate physical storage location within the specified geographic region(s). In this manner, implementations of the invention provide for the compartmentalization of files for storage and/or business process execution into a specific geographic region inside a cloud as required by law, regulations, business need, or any other reason.

Due to the diverse geographic regions of many of the hardware elements in the cloud computing environment 50, cloud computing faces challenges with respect to data security and legal compliance. The above-described nodes 10 and, in particular, the above-described servers and storage devices of a cloud computing environment 50 may be located in numerous different geographic regions, e.g., different countries around the world. Typically, when a user stores data in the cloud computing environment 50, the user has no control over where their data is physically stored. However, there are some laws and/or regulations that mandate having certain electronic data residing on computing devices within the geographic boundary of a country, and prior approval is needed before data can be stored outside of the acceptable geographic boundary. Such requirements become highly problematic in a public cloud or a multi-national private cloud which is spread across data centers residing in different counties and/or continents.

Implementations of the invention address these challenges by providing the user, e.g., cloud consumer, with the ability to specify one or more acceptable geographic regions for storing their data. In embodiments, the user may make such specifications using extended file attributes and/or predefined rules. The predefined rules may be based on at least one of: file content; semantic data; user identity; group association; and device location. In accordance with aspects of the invention, an intelligent routing system 80 shown in FIG. 1 analyzes the extended file attributes and/or predefined rules and causes the user data to be stored in the user-specified location. In this manner, a user may stipulate where their data is physically stored, rather than simply placing their data on the cloud without regard to where the data may physically reside. Stated differently, the user may employ aspects of the invention to prevent their data from being physically stored at one or more undesired locations. Such control of data storage location can be useful for compliance with laws, regulations, business practices, personal preferences, etc.

Figure 4:
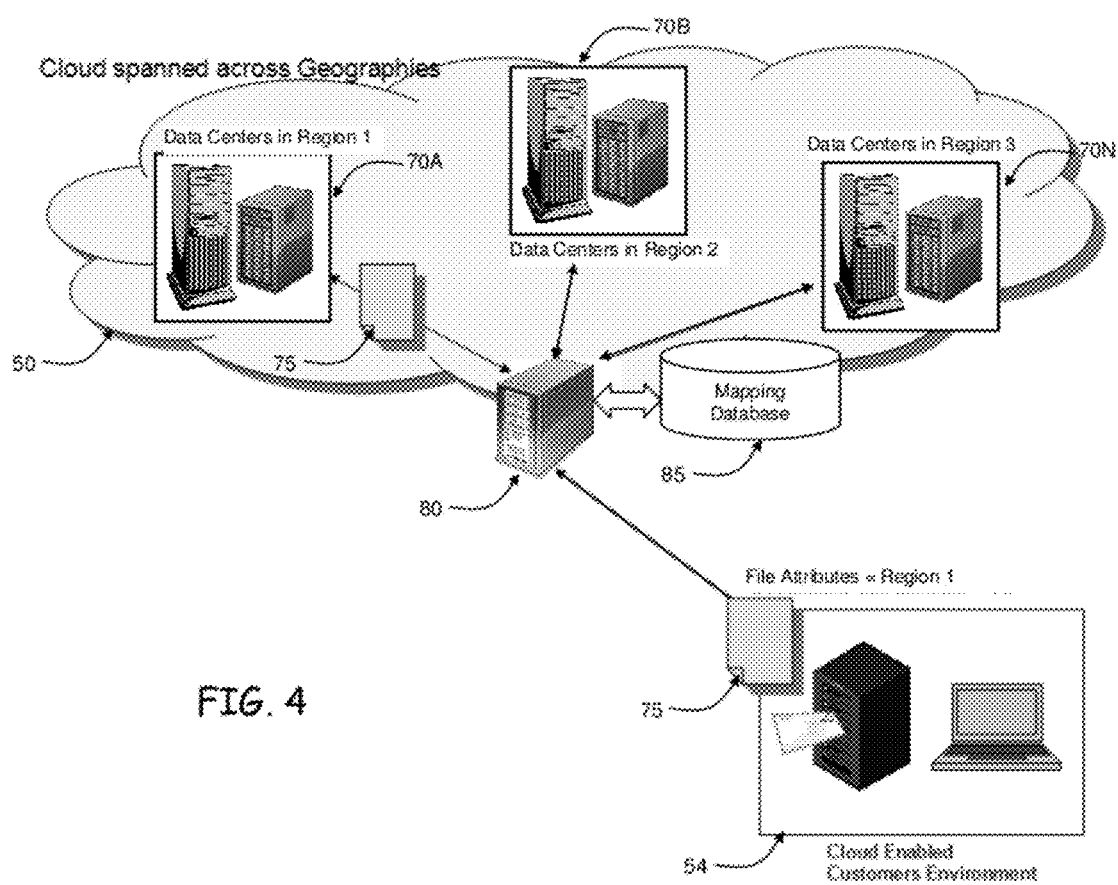
FIG. 4 depicts an exemplary operation of an embodiment of the present invention.

FIG. 4 depicts an exemplary operation of an embodiment of the present invention. As depicted in FIG. 4, a cloud computing environment 50 may comprise a plurality of data storage centers 70A, 70B, . . . , 70N, located in different geographic regions. For example, data storage center 70A may be located in the Region 1, data center 70B may be located in the Region 2, and data storage center 70N may be located in Region 3. These depicted locations are merely exemplary, and there may be any number of data storage centers located in any desired locations throughout the world.

Still referring to FIG. 4, in accordance with aspects of the invention, when a user of a local computing device 54 saves data 75 onto the cloud computing environment 50, the intelligent routing system 80 analyzes at least one of extended file attributes and/or predefined rules associated with at least one of the data 75, the user, and the local computing device 54. Based on the at least one of extended file attributes and/or predefined rules, the intelligent routing system 80 causes the data 75 to be stored in a particular data storage center 70A-N in the cloud computing environment 50, as described in greater detail herein with respect to FIGS. 5-8. In the example shown in FIG. 4, the intelligent routing system 80 causes the data 75 to be physically stored at the data storage center 70A located in Region 1. As used herein, a local computing device 54 refers to any local computing device 54A-N described above with respect to FIG. 2 which may communicate with the cloud computing environment 50. Furthermore, data 75 refers to any data that may be stored in the cloud computing environment 50 including, but not limited to, a file.

In embodiments, the intelligent routing system 80 may be comprised in any one of the nodes 10 in the cloud computing environment 50. For example, the intelligent routing system 80 may comprise hardware and/or software in one or more nodes 10 that performs one or more functions of the invention described herein. More specifically, the intelligent routing system 80 may be integrated with a cloud data management module and interfaced between the local computing device 54 and the remainder of the cloud computing environment 50. Alternatively, the intelligent routing system 80 may comprise one or more of the nodes 10, or may be a stand-alone device in communication with one or more of the nodes 10. In further embodiments, the intelligent routing system 80 may comprise or communicate with one or more databases 85 which map the data storage centers 70A-N with details of the geographic regions where the respective data storage centers 70A-N are located.

As will be appreciated by one skilled in the art, aspects of the present invention, including the intelligent routing system 80 and the functionality provided therein, may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5A:
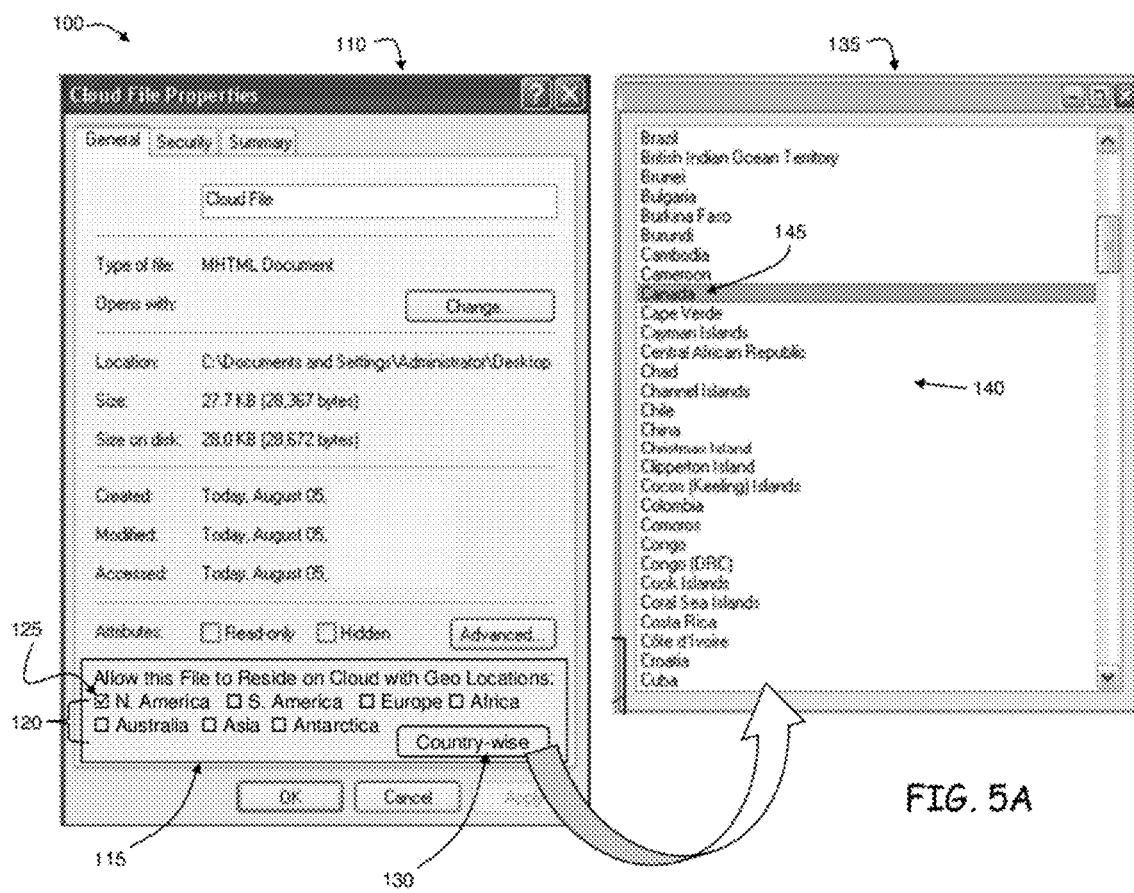
FIG. 5A depicts an exemplary user interface and associated functionality in accordance with aspects of the invention.

FIG. 5A depicts an exemplary user interface 100 and associated functionality in accordance with aspects of the invention. In embodiments, the interface 100 includes a properties window 110 that is presented on a local computing device, e.g., local computing device 54. The interface 100 may be presented on the local computing device in response to the user performing a prescribed pattern of mouse clicks, keystrokes, touch-screen selections, etc. As but one of many possible examples, the interface 100 may be presented when the user selects an existing file, right-clicks the mouse pointer on the selected file, and selects "Properties" from a menu. Additionally or alternatively, the interface 100 may be automatically presented to the user on the local computing device when a file is being saved.

According to aspects of the invention, the interface 100 comprises a geographic region selection portion 115 that includes at least one selectable geographic region 120. In accordance with aspects of the invention, the geographic regions 120 may be provided to the local computing device by the intelligent routing system 80 which determines the available storage locations (e.g., data storage centers 70A-N) from the cloud computing environment (e.g., cloud computing environment 50) and one or more mapping databases (e.g., database(s) 85). In embodiments, the mapping database (e.g., database(s) 85) defines an association between respective geographic regions and storage locations (e.g., data storage centers 70A-N).

A user of the local computing device may select one or more of the selectable geographic regions 120 by, for example, clicking a check-box 125 with their mouse. The selectable geographic regions 120 correspond to physical locations where data may be physically stored in the cloud computing environment, e.g., cloud computing environment 50. In embodiments, by selecting one or more of the selectable geographic regions 120, the user is specifying one or more geographic regions where this particular file may be physically stored in the cloud computing environment. As described in greater detail herein, the one or more selected locations are saved as a file attribute that can be analyzed by the intelligent routing system for determining where to save the file in the cloud computing environment.

The illustrative interface 100 depicted in FIG. 5A shows selectable geographic regions including: the Americas, Europe, Asia, Pacific, Africa, and Australia. These geographic regions are merely exemplary, however, and any desired geographic regions and any number of desired geographic regions may be presented in the geographic region selection portion 115. Moreover, the geographic regions 120 may be defined with any desired level of granularity including, but not limited to, continents, sub-continents, countries, states, cities, municipalities, counties, postal codes, and any other defined geographic area.

The interface 100 may additionally be provided with a field 130 that provides one or more sub-levels of granularity. In the example, depicted in FIG. 5A, the user has selected the Americas in geographic region selection portion 115. By also selecting, e.g., clicking, the field 130, the user is presented with an additional interface 135 that includes a list 140 of geographic regions of finer levels of the granularity. The finer level of granularity presented in list 140 may be a finer level of granularity of the particular selection 125, or a finer level of granularity of all of the possible selectable geographic regions 120. The user may select one or more geographic regions from the list 140, e.g., such as Region 1 identified by reference number 145, to narrow the geographic regions where the file may be saved in the cloud computing environment. Although not shown, any number of desired additional levels of granularity may be provided. For example, the interface 135 may be provided with a field (not shown) that permits the user to select from a list of geographic regions within the selection 145, e.g., from a list of geographic regions within Region 1.

The interface 100 is merely exemplary and is not intended to be the only manner of presenting selectable geographic regions 120, 140, etc., to the user, and any suitable interface may be employed within the scope of the invention for presenting selectable geographic regions 120, 140, etc., to the user on the local computing device.

In embodiments, the one or more geographic regions 120, 140, etc., selected by the user are stored as one or more extended file attributes associated with the particular file (e.g., data 75). These attributes may be stored temporarily at the local computing device and/or the intelligent routing system, and may be stored permanently with the file in accordance with standard practices for maintaining other file attributes. Providing support for additional, e.g., new, file attributes is known to those of ordinary skill in the art, such that further explanation is not believed necessary. In accordance with aspects of the invention, the extended file attribute specifying the user-selected geographic region for storing the file may be incorporated into any filesystem and/or an interoperable access control list (ACL) supported by a filesystem. In embodiments, when a user selects one or more of the geographic regions 120, 140, etc., a corresponding file attribute is created and associated with the file (e.g., data 75). The file attribute may be analyzed by the intelligent routing system for determining where to save the file in the cloud computing environment.

In embodiments, the intelligent routing system reads and parses the file attributes of a file that specify the desired geographic region, and the intelligent routing system causes the file to be stored at a location within the cloud computing environment corresponding to the geographic region specified by the file attributes. For example, when a user is initially saving a file, the intelligent routing system reads the file attributes and routes the file to a data storage center in a corresponding geographic region. As another non-limiting example, when a user changes the selected geographic region for a file that is already stored in a first data storage center in the cloud, the intelligent routing system copies the file from a first data storage center in the first geographic region to a second data storage center in the newly specified geographic region, and then deletes the copy of the file from the first data storage center.

In accordance with further aspects of the invention, the geographic region for storing a file (e.g., data 75) may be specified by predefined rules, which may be an alternative to or in addition to user-specified file attributes. The predefined rules may include, for example, file content, semantic data, user identity, group association, and device location. The rules may be defined in a rules engine via appropriate coding and/or programming.

As but one possible non-limiting example of a predefined rule, a business running over the cloud computing environment may specify in the rules engine that all files owned and/or generated by particular users are constrained to be saved to a predefined geographic region, e.g., Region 1. The particular users to which this rule applied may be defined in a group based on their user identifications. In this manner, when a user accesses the cloud using one of the user identifications defined in the group, the user's files are all specified to be saved to the predefined geographic region. Using this predefined geographic region, the intelligent routing system identifies a data storage center within the predefined geographic region and routes the data to the identified data storage center. The list of user identifications in the group and the one or more predefined geographic regions associated with the group may be defined in the rules engine. The intelligent routing system may use this rule to store files associated with members of the group at the one or more predefined geographic regions in the cloud.

As another non-limiting example, a single user may create a predefined rule that all of his or her files are to be stored at one or more specified geographic regions, e.g., similar to geographic regions 120, 140, etc. In this manner, when the user accesses the cloud, the intelligent routing system may determine from the user identification that any file saved by this user must be stored at one of the predefined specified geographic regions, identify a data storage center within the predefined geographic region, and cause the data to be saved at the identified data storage center within the predefined geographic region by routing the data to the identified data storage center within the predefined geographic region.

A group or a single user may also provide predefined rules with additional levels of granularity. For example, a predefined rule may specify that a file of a particular type, e.g., spreadsheet, word processing, presentation, graphics, multimedia, etc., always be saved to a specified geographic region, e.g., similar to geographic regions 120, 140, etc. As another non-limiting example, a predefined routing rule may be based on textual content of the file, such that a file containing a particular word (e.g., "confidential") in the filename or within the body of the file is always saved to a specified geographic region. As yet another non-limiting example, a predefined routing rule may be based on metadata (e.g., semantic data)

associated with the file, such that a file containing a particular metadata tag is always saved to a specified geographic region. These examples of predefined rules are intended to be illustrative of aspects of the invention, and are not intended to limit the invention. Any type of predefined rule based on any desired parameter may be programmed into the rules engine and used by the intelligent routing system to save data to a data storage location within a specified geographic region.

In further embodiments, one or more predefined rules may be based on an identification and location of the local computing device (e.g., local computing device 54). For example, a predefined rule may be implemented such that a local computing device, such as mobile intelligent phone, laptop computer, etc., is confined to saving data to physical storage locations in the cloud which storage locations correspond to a geographic region containing the current location of the local computing device. In particular, the current location of the local computing device may be determined by global positioning system (UPS), or any other suitable method, to be within a particular geographic region, e.g., Region 2. Based on the predefined rule, any data owned by or associated with the local computing device can only be saved to physical data storage locations within the particular geographic region, e.g., the United States. Access to data may be restricted in a similar manner. For example, when the local computing device is determined to be currently located within a particular geographic region, e.g., Region 2, the local computing device may be confined to accessing only data that is physically stored at locations within the particular geographic region, e.g., Region 2. Such rules may be beneficial for businesses and/or governments wishing to control data access by their employees, agents, officials, etc., in order to comply with laws, regulations, best practices, etc.

The predefined rules described herein may be defined and implemented in appropriate programming at the intelligent routing system (e.g., intelligent routing system 80) and/or at the user's local computing device (e.g., local computing device 54). For example, properties of one or more predefined rules may be input and stored locally (e.g., at the local computing device) or may be stored in a remote depository such as a Lightweight Directory Access Protocol (LDAP) that is accessible by at least one of the intelligent routing system and/or at the local computing device. The predefined rules may be used in addition to or as an alternative to the extended file attributes specified by the user. Also, more than one predefined rule may be applied at any given time. For example, a user may be defined as a member of a group with specified geographic regions, and the user may also have defined one or more rules based on the file type and textual content. In these situations, the predefined rules are applied in combination to arrive at one or more geographic regions that satisfy all of the applicable rules.

In embodiments when one or more predefined rules exist, the interface 100 presented to the user may be adjusted according to the predefined rules. For example, the interface 100 may be presented to the user in a manner such that only the geographic regions specified in the predefined rules are available as user-selectable choices. Stated differently, geographic regions that are not permitted by (e.g., do not satisfy) any applicable predefined rules are either not included in the interface 100, or are shown but not selectable in the interface 100. When a predefined rule results in only a single acceptable geographic region, the interface 100 may be presented to the user in a pre-populated manner with the single geographic region already selected and no other choices available to the user. Such modification of the interface 100 may be controlled by the intelligent routing system and/or the local computing device using the predefined rules engine and appropriate programming.

In accordance with aspects of the invention, the user may be prompted with an exception message, such as a visual display on the local computing device, when there is a conflict between any of: two or more predefined rules, one or more predefined rules and user-defined extended file attributes, one or more predefined rules and a currently available data storage location (e.g., 70A-N), and user-defined extended file attributes and a currently available data storage location (e.g., 70A-N). For example, when two or more predefined rules that are applicable to a particular user and file result in no acceptable storage locations, the user may be notified of this conflict via an exception message 200, e.g., error message, on the local computing device, as depicted in FIG. 5B. The error message 200 may indicate that the file will not be saved on the cloud and must be saved locally on the local computing device. Additionally or alternatively, the error message 200 may provide the user with one or more alternative geographic regions and a selectable confirmation field indicating that the user is overriding one or more of the rules.

As another non-limiting example, an error message may be presented to the user when the user has selected a location (e.g., from interface 100) and the intelligent routing device determines that the selected location is currently unavailable, e.g., offline, overloaded, etc. The error message may indicate that the file will not be saved on the cloud and must be saved locally on the local computing device. Additionally or alternatively, the error message may provide the user with one or more alternative geographic regions and prompt the user to select one of the alternative locations.

Flow Diagram

Figure 6:
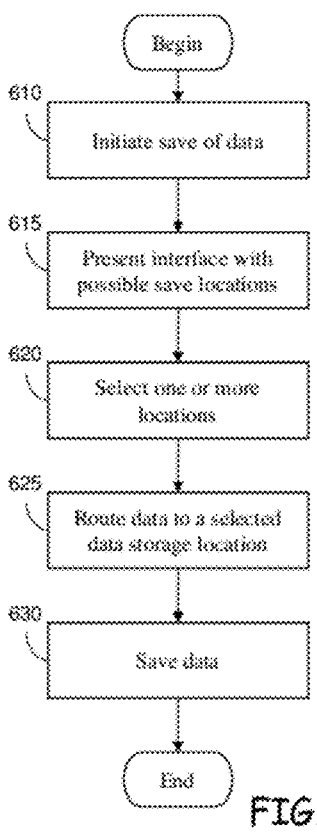
FIGS. 6-8 show exemplary flow diagrams in accordance with aspects of the invention.
Figure 7:
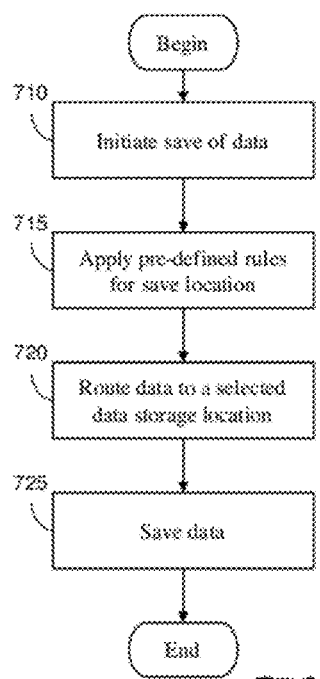
Figure 8:
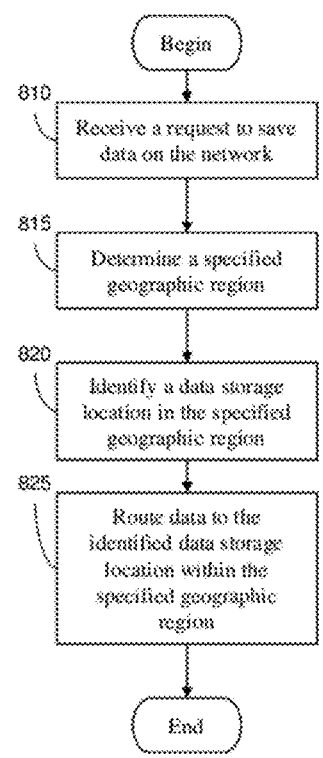

FIGS. 6-8 show exemplary flows for performing aspects of the present invention. The steps of FIGS. 6-8 may be implemented in any of the environments of FIGS. 1-4, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIGS. 1-4. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disc—read/write (CD-R/W) and DVD.

FIG. 6 depicts an exemplary flow for a process in accordance with aspects of the present invention. At step 610, a user of a local computer device (e.g., device 54) initiates a process to save data to the cloud computing environment. This may be performed in a conventional manner, such as by selecting the "Save" option in a word processing application while logged-on to the cloud computing environment.

At step 615, the intelligent routing system presents the user with an interface (e.g., interface 100) with possible geographic regions for saving the file. For example, in embodiments, the intelligent routing system analyzes storage locations (e.g., data storage centers 70A-N) in the cloud and a mapping in a database (e.g., database 85), and presents available geographic regions to the user via an interface (e.g., interface 100) displayed on the local computer device. Step 615 may additionally comprise, but does not necessarily include, the intelligent routing system and/or the local computing device applying one or more predefined rules and modifying the available selectable geographic regions(s) presented in the interface according to the rules. The predefined rules may be based on at least one of: file content, semantic data, user identity, group association, device location, etc.

At step 620, the user selects one or more of the geographic regions in the interface. This may be accomplished as described above with respect to FIG. 5A.

At step 625, the intelligent routing system routes the data to a data storage center (e.g., data storage centers 70A, 70B, . . . , 70N) located within the user-selected geographic region(s). This may be performed by routing the data over appropriate network connections in the cloud computing environment. At step 630, the data is physically stored at the data storage center.

FIG. 7 depicts an exemplary flow for another process in accordance with aspects of the present invention. At step 710, a user of a local computer device (e.g., device 54) initiates a process to save data to the cloud computing environment. This may be performed in a conventional manner, such as by selecting the "Save" option in a word processing application while logged-on to the cloud computing environment.

At step 715, the intelligent routing system and/or the local computing device apply one or more predefined rules and determine a geographic region in which the data is to be saved based on the predefined rules. The predefined rules may be based on at least one of: file content, semantic data, user identity, group association, and device location, amongst other rules. In embodiments, step 715 is performed without analyzing any user-selected extended file attributes. In this manner, this implementation of the invention routes the data to a physical storage location within a predefined geographic region based on predefined rules alone without any user-selected file attributes.

At step 720, the intelligent routing system routes the data to a data storage center (e.g., data storage centers 70A, 70B, . . . , 70N) located within the predefined geographic region(s). This may be performed by routing the data over appropriate network connections in the cloud computing environment. At step 725, the data is physically stored at the data storage center.

FIG. 8 depicts an exemplary flow for another process in accordance with aspects of the present invention. At step 810, the intelligent routing system (e.g., intelligent routing system 80) receives a request from a local computing device (e.g., local computing device 54) to save data on the network (e.g., cloud computing environment 50).

At step 815, the intelligent routing system determines a specified geographic region in which to save the data by analyzing at least one of: file attributes associated with the data, and predefined rules. The file attributes may be a user-selected file attribute as described above with respect to FIG. 5A, and may be analyzed by the intelligent routing system to determine one or more corresponding specified geographic regions. The predefined rules may specify one or more geographic regions based on any of file content, semantic data, user identity, group association, and local computing device location, as described herein.

At step 820, the intelligent routing system identifies a data storage location in the specified geographic region. This may comprise comparing the specified geographic regions determined in step 815 to a mapping database (e.g., database 80) that defines an association between respective geographic regions and data storage locations (e.g., data storage centers 70A-N) available on the cloud. At step 825, the intelligent routing system causes the data to be saved at the identified data storage location within the specified geographic region by routing the data to the identified data storage location within the specified geographic region, and data storage center physically saves the data.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed:

1. A method implemented in a computer infrastructure comprising a combination of hardware and software, the method comprising:
receiving a request from a local computing device to save data on a network comprising a plurality of data storage locations in a plurality of different geographic regions and file attributes associated with the data;
determining, based on the request, a specified geographic region of the plurality of different geographic regions by analyzing at least one of: (i) the file attributes associated with the data, and (ii) predefined rules;
identifying one of the plurality of data storage locations within the specified geographic region based on the determining step;
routing the data to the identified one of the plurality of data storage locations within the specified geographic region;
receiving, from the local computing device, a request to change the specified geographic region to another geographic region; and
sending the data to another data storage location in the another geographic region based on receiving the request to change the specified geographic region.

2. The method of claim 1, wherein:
the local computing device is using a service provider's application running on network infrastructure remote from the local computing device; and
the data is associated with the application.

3. The method of claim 2, wherein the local computing device is accessing the service provider's application via a web browser, and the sending the data to the another data storage location includes copying the data to the another data storage location in the another geographic region and deleting the data from the data storage locations within the specified geographic region.

4. The method of claim 1, wherein:
the local computing device is running an application or an operating system on a service provider's hardware remote from the local computing device; and
the data is associated with the application or the operating system.

5. The method of claim 1, wherein:
the determining the specified geographic region comprises analyzing the file attributes associated with the data; and
the file attributes were created in response to a selection of a user at the local computing device.

6. The method of claim 1, wherein the identifying comprises comparing the specified geographic region to a mapping database that associates geographic regions with the plurality of data storage locations.

7. The method of claim 1, wherein:
the determining the specified geographic region comprises analyzing the predefined rules; and
the predefined rules are based on at least one of: file content, semantic data, user identity, group association, and local computing device location; and
further comprising:
receiving another request to select an alternate geographic region;
determining, based on one or more of the predefined rules, that there are no alternate data storage locations in the alternate geographic region; and
sending an error message to the local computing device that the alternate data storage locations are not available in the alternate geographic region.

8. The method of claim 1, further comprising presenting a plurality of selectable geographic regions to the local computing device.

9. The method of claim 8, further comprising determining the plurality of selectable geographic regions based on the predefined rules, wherein at least one of the plurality of different geographic regions is omitted from the plurality of selectable geographic regions based on the predefined rules.

10. The method of claim 1, wherein a service provider at least one of creates, maintains, deploys and supports the computer infrastructure.

11. The method of claim 1, wherein steps of claim 1 are provided by the service provider on a subscription, advertising, and/or fee basis.

12. A computer system for saving data on a network, the system comprising:
a CPU, a computer readable memory and a computer readable storage media;
first program instructions to present a plurality of geographic regions to a local computing device, wherein the plurality of geographic regions are associated with a plurality of data storage locations in a network, and the local computing device is accessing the network;
second program instructions to receive a specification of at least one of the plurality of geographic regions from the local computing device;
third program instructions to cause data associated with the local computing device to be physically stored at a device located within the specified at least one of the plurality of geographic regions;
fourth program instructions to receive a change in location of the local computing device;
fifth program instructions to determine another geographic region that includes another data storage location; and
sixth program instructions to send the data to the another data storage location in the another geographic region based on the change in the location of the local computing device,
wherein the first, second, third, fourth, fifth, and sixth program instructions are stored on the computer readable storage media for execution by the CPU via the computer readable memory.

13. The system of claim 12, wherein:
the network comprises a cloud computing infrastructure;
the local computing device is using a service provider's application running on the cloud computing infrastructure at a location remote from the local computing device; and
the data is associated with the application.

14. The system of claim 12, wherein:
the network comprises computing resources of at least one service provider; and
the computing resources are pooled to serve multiple consumers using a multi-tenant model, with different physical and virtual resources dynamically assigned and reassigned according to demand.

15. The system of claim 12, wherein:
the network comprises a cloud computing infrastructure;
the local computing device is running an application or an operating system on a service provider's hardware in the cloud computing infrastructure and remote from the local computing device; and the data is associated with the application or the operating system.

16. The system of claim 12, wherein an intelligent routing system interfaced between the local computing device and the network performs the presenting, the receiving, and the causing the data to be physically stored.

17. The system of claim 12, wherein the specification of at least one of the plurality of geographic regions comprises a file attribute.

18. The system of claim 17, further comprising creating the file attribute based on a selection of a user.

19. The system of claim 17, further comprising comparing the file attribute to a mapping database for determining a network identity of a storage location corresponding to the specified at least one of the plurality of geographic regions.

20. The system of claim 12, wherein the presenting the plurality of geographic regions is based on at least one predefined rule, and the predefined rule is based on metadata contained in a file associated with the data.

21. The system of claim 20, wherein the at least one predefined rule is based on at least one of: file content, semantic data, user identity, group association, and local computing device location.

22. A computer program product comprising a computer usable storage hardware device having readable program code embodied in the storage hardware device, the computer program product includes at least one component operable to:
receive a request from a local computing device to save data on a network; determine available data storage locations in the network;
determine a plurality of geographic regions associated with the available data storage locations;
cause an interface to be presented at the local computing device, wherein the interface presents the plurality of geographic regions and permits a user of the local computing device to select one of the plurality of geographic regions; and
cause the data to be saved at one of the available data storage locations within the one of the plurality of geographic regions selected via the interface;
receive a change in location of the local computing device; determine another geographic region that includes another data storage location; and
send the data to the another data storage location in the another geographic region based on the change in the location of the local computing device.

23. A system, comprising: an intelligent routing system comprising a processor, a bus, and a storage device, and interfaced between a local computing device and a network, wherein the network comprises a plurality of data storage locations in a plurality of different geographic regions, and
wherein the intelligent routing system is configured to:
receive a request from the local computing device to save data on the network, wherein the request includes a file attribute associated with the data;
determine a specified geographic region by analyzing the file attributes associated with the data and predefined rules;
identify one of the plurality of data storage locations within the specified geographic region;
cause the data to be saved at the identified one of the plurality of data storage locations within the specified geographic region by routing the data to the identified one of the plurality of data storage locations within the specified geographic region;
receive, from the local computing device, another request to change the specified geographic region to another geographic region;
copy the data in another data storage location in the another geographic region based on receiving the another request; and
delete the data from the data storage locations in the specified geographic region.

* * * * *